United States Patent
JeanJean et al.

(10) Patent No.: US 7,227,934 B2
(45) Date of Patent: Jun. 5, 2007

(54) METHOD AND APPARATUS FOR PROCESSING MULTIPLE SIGNALS TRANSCEIVED THROUGH A COUPLING

(75) Inventors: François JeanJean, Wemmel (BE); Frank Octaaf Van der Putten, Leest (BE)

(73) Assignee: Alcatel, Paris (FR)

( * ) Notice: Subject to any disclaimer, the term of this patent is extended or adjusted under 35 U.S.C. 154(b) by 339 days.

(21) Appl. No.: 10/252,406

(22) Filed: Sep. 24, 2002

(65) Prior Publication Data
US 2003/0059011 A1 Mar. 27, 2003

(30) Foreign Application Priority Data
Sep. 27, 2001 (EP) .................... 01402479

(51) Int. Cl.
*H04M 11/00* (2006.01)
(52) U.S. Cl. .................. 379/93.28; 379/93.09
(58) Field of Classification Search ............ 379/93.28, 379/93.31, 93.08, 93.09, 93.01, 90.01, 93.05; 375/222
See application file for complete search history.

(56) References Cited

U.S. PATENT DOCUMENTS

| | | | | |
|---|---|---|---|---|
| 3,955,051 A | | 5/1976 | Bitzer et al. | |
| 4,757,495 A | * | 7/1988 | Decker et al. | 370/477 |
| 5,905,781 A | | 5/1999 | McHale et al. | |
| 5,917,895 A | * | 6/1999 | Van Der Stoel | 379/93.09 |
| 6,061,392 A | * | 5/2000 | Bremer et al. | 375/222 |
| 6,160,872 A | * | 12/2000 | Karnowski et al. | 379/93.09 |
| 6,324,268 B1 | * | 11/2001 | Balachandran et al. | 379/93.08 |
| 6,522,730 B1 | * | 2/2003 | Timm et al. | 379/93.08 |

FOREIGN PATENT DOCUMENTS

EP 0806852 A2 11/1997

* cited by examiner

*Primary Examiner*—Stella Woo
(74) *Attorney, Agent, or Firm*—Sughrue Mion, PLLC

(57) ABSTRACT

Conventional modems coupled in parallel to a coupling need a sharing apparatus, which can be avoided by providing each modem with a detector for detecting upstream/downstream signals to be transceived by other modems coupled in parallel. The detector has a distinguisher for distinguishing upstream signals and downstream signals. An additional filter between the coupling and detector prevents the modem from interfering with the other modems coupled in parallel. The modem may have an active/passive state corresponding with a lower/higher impedance.

15 Claims, 2 Drawing Sheets

METHOD AND APPARATUS FOR PROCESSING MULTIPLE SIGNALS TRANSCEIVED THROUGH A COUPLING

BACKGROUND OF THE INVENTION

The invention relates to a modem to be coupled to a network via a coupling and comprising a detector for detecting coupling signals.

Such a modem is generally known, with the network, for example, being a public and/or private telecommunication network, and with the coupling being, for example, a wired connection or a wireless coupling. The detector detects the signals flowing via the coupling, e.g., ringing signals indicating that a call is made from the network to the modem and/or DC currents indicating that a telephony device is connected in parallel to the modem is involved in a call.

U.S. Pat. No. 5,530,951 discloses a telephone line sharing apparatus for enabling a plurality of telecommunications devices of any type to share a plurality of single subscriber telephone lines.

The known modem is disadvantageous, inter alia, due to several of these modems when connected in parallel, especially but not exclusively Digital Subscriber Line modems or DSL modems, needing such a complicated sharing apparatus.

SUMMARY OF THE INVENTION

It is an aspect of the invention, inter alia, of providing a modem which can be connected in parallel to an other modem without needing the complicated sharing apparatus.

The modem according to the invention is characterized in that the modem comprises a transceiver for transceiving upstream/downstream signals via the coupling, with the detector detecting upstream/downstream signals to be transceived by an other modem coupled to the coupling in parallel to the modem.

By providing the modem according to the invention with the detector for detecting upstream/downstream signals to be transceived by the other modem coupled to the coupling in parallel to the modem according to the invention, with each modem, of course, comprising the transceiver for transceiving upstream/downstream signals via the coupling, the modem according to the invention has knowledge of what is going on via the coupling at any time.

The invention is based on the insight, inter alia, that functions, such as processor capacity at a central location, can be relocated at decentralized locations, and vice versa, with especially, but not exclusively, Digital Subscriber Line modems or DSL modems already being provided with high processor capacities.

The invention solves the problem, inter alia, of providing a modem which can be connected in parallel to an other modem without needing the complicated sharing apparatus, by letting the modem according to the invention detect upstream/downstream signals to be transceived by an other modem coupled to the coupling in parallel to the modem according to the invention.

Upstream/downstream signals comprise upstream signals (for example, at 150 kHz) and/or downstream signals (for example, at 500 kHz). And, of course, more than two modems can be connected in parallel.

A first embodiment of the modem according to the invention is characterized in that the detector comprises a distinguisher for distinguishing upstream signals to be tranceived from the other modem via the coupling to the network and downstream signals to be transceived from the network via the coupling to the other modem.

By providing the detector in the modem according to the invention with the distinguisher for distinguishing upstream signals and downstream signals, the modem according to the invention has all knowledge of what is going on via the coupling at any time.

The distinguisher, for example, comprises two bandpass filters, one for the upstream and one for the downstream.

A second embodiment of the modem according to the invention is characterized in that the modem comprises a filter to be coupled to the coupling.

By providing the modem according to the invention with the filter, e.g., a highpass filter, during detecting, the modem according to the invention does not interfere with the other (possibly transceiving) modem.

A third embodiment of the modem according to the invention is characterized in that the modem comprises a switch coupled to the detector and to the transceiver for, in response to the detecting, switching the modem in an active/passive state.

By providing the modem according to the invention with the switch for switching the modem in an active/passive state, during detecting the modem will be in a passive state, and in case of no detection of present streams, the modem can be switched into an active state.

A fourth embodiment of the modem according to the invention is characterized in that the modem in the active/passive state corresponds with a lower/higher impedance.

Then, an active state will correspond with the coupling (as well as the other modem) noticing a lower impedance, and a passive state will correspond with the coupling (as well as the other modem) noticing a higher impedance.

A fifth embodiment of the modem according to the invention is characterized in that the modem comprises a hybrid comprising a first serial circuit including a first impedance and a first switch with a first point of them to be coupled to a first wire of the coupling, and comprising a second serial circuit including a second impedance and a second switch with a first point of them to be coupled to a second wire of the coupling, and comprising a third serial circuit including third impedances located between the wires of the coupling and coupled to the first points of the first and second serial circuits, and comprising a fourth serial circuit including fourth impedances coupled to second points of the first and second serial circuits.

Such a hybrid, with the switches being in a conductive state, corresponds with a lower impedance (active state), and with the switches being in a non-conductive state, corresponds with a higher impedance (passive state), whereby the detector is to be coupled to common points of the third and fourth serial circuits, and with the rest of the modem to be coupled to the second points.

The invention further relates to a method for coupling a modem to a network via a coupling and comprising a step of detecting coupling signals.

The method according to the invention is characterized in that the method comprises a step of detecting upstream/downstream signals via the coupling to be transceived by an other modem coupled to the coupling in parallel to the modem.

A first embodiment of the method according to the invention is characterized in that the method comprises a step of distinguishing upstream signals to be tranceived from the other modem via the coupling to the network and downstream signals to be transceived from the network via the coupling to the other modem.

A second embodiment of the method according to the invention is characterized in that the method comprises a step of filtering between the modem and the coupling.

A third embodiment of the method according to the invention is characterized in that the method comprises a step of, in response to the detecting, switching the modem in an active/passive state.

U.S. Pat. No. 5,530,951 discloses a telephone line sharing apparatus for enabling a plurality of telecommunications devices of any type to share a plurality of single subscriber telephone lines. U.S. Pat. No. 6,259,775 discloses a multi-line modem interface circuit including a sensing circuit for identifying a status of one or more external lines. This interface circuit is operable to automatically monitor a line to determine if it's ringing, determine whether it's allowed and couple the line to the modem for potential answer. U.S. Pat. No. 6,092,122 discloses a Digital Subscriber Line modem or DSL modem. None of these references discloses the modem according to the invention. All these references, including further references cited with respect to these references, are considered to be included in this patent application.

BRIEF DESCRIPTION OF THE DRAWINGS

The invention will be further explained in more detail as shown in the drawings, whereby.

DETAILED DESCRIPTION OF THE INVENTION

Figure 1:
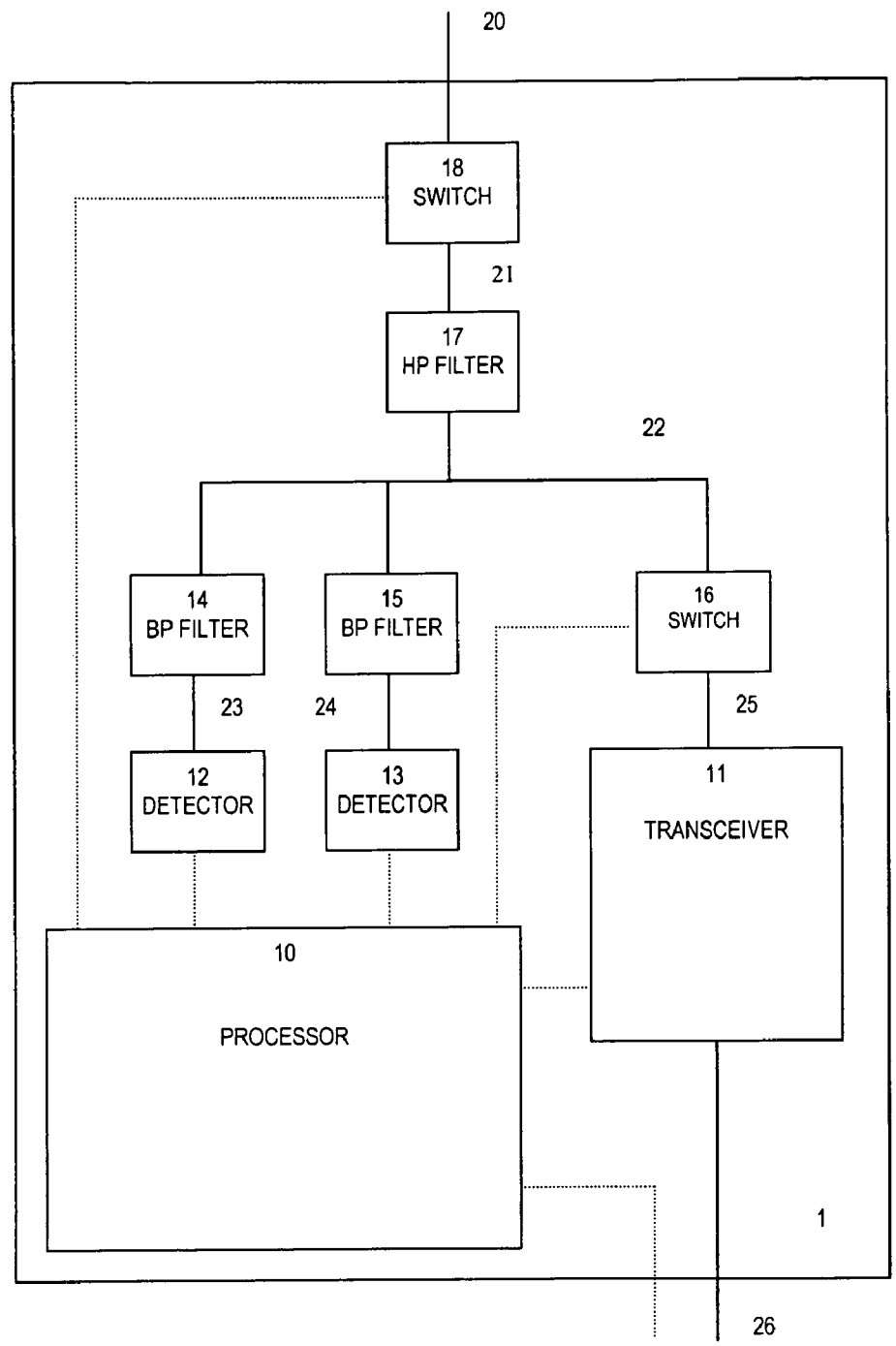
FIG. 1 discloses a first modem according to the invention comprising a detector and a tranceiver and a highpass filter, and FIG. 2 discloses a second modem according to the invention comprising a detector and a transceiver and a hybrid.

FIG. 1 discloses a first modem 1 according to the invention (for example, a Digital Subscriber Line modem or DSL modem) comprising a processor 10 and a transceiver 11 coupled via a connection 26 to, for example, a PC (not shown) and via a connection 25 to a switch 16, which via a connection 22 is coupled to a highpass filter 17 and to bandpass filters 14 and 15. Bandpass filters 14, 15 are coupled via connections 23, 24 to detectors 12, 13. Highpass filter 17 is coupled via a connection 21 to a switch 18, which is coupled via a (wired or wireless) coupling 20 to a (public and/or private) network (not shown) and is coupled wiredly or wirelessly to an other modem (not shown). Processor 10 is coupled via control connections to switches 16, 18, to detectors 12, 13 and to transceiver 11.

The first modem 1 according to the invention comprises detectors 12, 13, transceiver 11 and highpass filter 17 functions as follows.

According to a first embodiment, the other modem (not shown) is not involved in any communication with the network (not shown) (in other words being in a passive state), and the PC (not shown) wishes to start a communication with the network. Then, processor 10 is informed, which switches switch 18 into a conductive state and which controls detectors 12, 13 for starting detecting, with detector 12, for example, detecting upstream signals (at, for example, 150 kHz and filtered by bandpass filter 14) flowing from the other modem to the network and with detector 13, for example, detecting downstream signals (at, for example, 500 kHz and filtered by bandpass filter 15) flowing from the network to the other modem. Due to the other modem not being in an active state, detectors 12, 13 will not detect any streams exchanged between the other modem and the network, and inform processor 10. In response to this, processor 10 informs the PC to start generating data and switches switch 16 into a conductive state and controls transceiver 11 such that the data, together with set-up-information, is sent to the network and that further data originating from the network can be processed.

According to a second embodiment, the other modem (not shown) is involved in a communication with the network (not shown) (in other words being in an active state), and the PC (not shown) wishes to start a communication with the network. Then, processor 10 is informed, which switches switch 18 into a conductive state and which controls detectors 12, 13 for starting detecting, with detector 12, for example, detecting upstream signals at, for example, 150 kHz and filtered by bandpass filter 14) flowing from the other modem to the network and with detector 13, for example, detecting downstream signals (at, for example, 500 kHz and filtered by bandpass filter 15) flowing from the network to the other modem. Due to the other modem now being in an active state, detectors 12, 13 will detect streams exchanged between the other modem and the network, and inform processor 10. In response to this, processor 10 informs the PC that communication is now impossible and keeps switch 16 in a non-conductive state.

According to a first possibility, the PC must take the initiative of trying again to start a communication with the network. Then, processor 10 will bring switch 18 into a non-conductive state, for example.

According to a second possibility, the processor 10, via detectors 12, 13 keeps on monitoring coupling 20, and keeps switch 18 in the conductive state, for example. As soon as the other modem has finished its communication, processor 10 brings switch 16 into a conductive state, informs the PC and the transceiver, etc.

According to a third embodiment, the PC knows that the network could start a communication with the PC via modem 1, and informs processor 10 which brings switch 18 into a conductive state (or keeps it in a conductive state) and monitors coupling 20 via detector 13, or the processor 10 knows that the network could start a communication with the PC via modem 1, and informs the PC and brings switch 18 into a conductive state (or keeps it in a conductive state) and monitors coupling 20 via detector 13 etc.

In FIG. 1, detectors 12 and 13 and bandpass filters 14 and 15 may, partly or entirely, be located, alternatively or additionally, for example, inside transceiver 11 and/or for example, in parallel to high pass filter 17 and/or switch 18.

Figure 2:
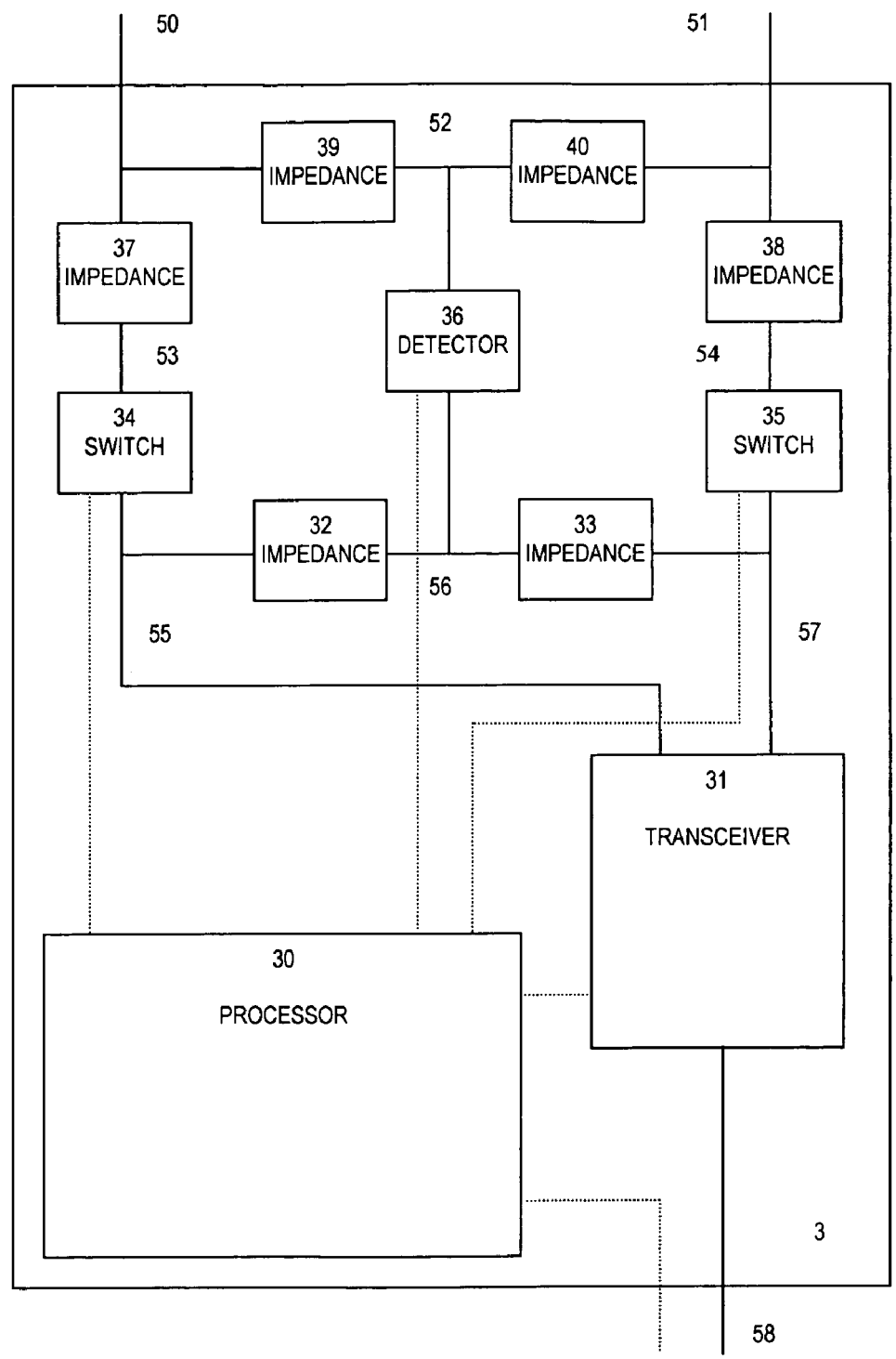

FIG. 2 discloses a second modem 3 according to the invention (for example, a Digital Subscriber Line modem or DSL modem) comprising a processor 30 and a transceiver 31 coupled via a connection 58 to, for example, a PC (not shown) and via a connection 55 to a second point of a first serial circuit including a first impedance 37 and a first switch 34 with a first point of them to be coupled to a first wire 50 of the coupling 50, 51 and via a connection 57 to a second point of a second serial circuit including a second impedance 38 and a second switch 35 with a first point of them to be coupled to a second wire 51 of the coupling 50, 51. A third serial circuit including third impedances 39, 40 located between the wires 50, 51 of the coupling 50, 51 is coupled to the first points of the first and second serial circuits, and a fourth serial circuit including fourth impedances 32, 33 is coupled to the second points of the first and second serial circuits. A detector 36 is located between common points 52, 56 of the third and fourth serial circuits. Again (wired or wireless) coupling 50, 51 is coupled to a (public and/or private) network (not shown) and is coupled wiredly or wirelessly to another modem (not shown). Processor 30 is coupled via control connections to switches 34, 35, to detector 36 and to transceiver 31.

The second modem 3 according to the invention comprising detector 36, transceiver 31 and hybrid 32, 33, 34, 35, 37, 38, 39, 40 functions as follows.

According to a fourth embodiment, the other modem (not shown) is not involved in any communication with the network (not shown) (in other words being in a passive state), and the PC (not shown) wishes to start a communication with the network. Then, processor 30 is informed, which controls detector 36 for starting detecting, with detector 36, for example, detecting upstream signals (at, for example, 150 kHz) flowing from the other modem to the network and, for example, detecting downstream signals (at, for example, 500 kHz) flowing from the network to the other modem. Due to the other modem not being in an active state, detector 36 will not detect any streams exchanged between the other modem and the network, and inform processor 30. In response to this, processor 30 informs the PC to start generating data and brings switches 34, 35 into a conductive state and controls transceiver 31 such that the data, together with set-up-information, is sent to the network and that further data originating from the network can be processed.

According to a fifth embodiment, the other modem (not shown) is involved in a communication with the network (not shown) (in other words being in an active state), and the PC (not shown) wishes to start a communication with the network. Then, processor 30 is informed, which controls detector 36 for starting detecting, with detector 36, for example, detecting upstream signals (at, for example, 150 kHz) flowing from the other modem to the network and, for example, detecting downstream signals (at, for example, 500 kHz) flowing from the network to the other modem. Due to the other modem now being in an active state, detector 36 will detect streams exchanged between the other modem and the network, and inform processor 30. In response to this, processor 30 informs the PC that communication is now impossible and keeps switches 34, 35 in a non-conductive state.

According to a first possibility, the PC must take the initiative of trying again to start a communication with the network.

According to a second possibility, the processor 30, via detector 36 keeps on monitoring coupling 50, 51. As soon as the other modem has finished its communication, processor 30 brings switches 34, 35 into a conductive state, informs the PC and the transceiver, etc.

According to a sixth embodiment, the PC knows that the network could start a communication with the PC via modem 3, and informs processor 30 which monitors coupling 50, 51 via detector 36, or the processor 30 knows that the network could start a communication with the PC via modem 3, and informs the PC and monitors coupling 50, 51 via detector 36 etc.

According to a seventh embodiment, second modem 3 in FIG. 2, entirely or partly and, for example, excluding processor 30, may correspond with transceiver 11 in FIG. 1, entirely or partly.

Each embodiment and/or each possibility can be combined with each other embodiment and/or each other possibility. Each part of each modem shown in the form of a block or (not shown), can be 100% hardware, 100% software or a mixture of both. Therefore, a detector also comprises a detecting function, a distinguisher also comprises a distinguishing function, a filter also comprises a filtering function, a switch also comprises a switching function, a transceiver also comprises a transceiving function etc. Each block shown or not shown can be integrated with each other block shown and/or not shown (for example, detector 12 and bandpass filter 14, and/or detector 13 and bandpass filter 15, and/or all four of them). Each processor will comprise a memory (not shown), and in addition, each block can have a further memory, which is not shown for efficiency purposes.

Each detector can comprise, for example, a demodulator and/or a comparator (or have a demodulating and/or a comparing function), thereby receiving comparison values from, for example, the processor. Each switch can, for example, be a relay, a transistor etc. Each impedance can, for example, be a resistance or an electronic impedance to be controlled by a processor, thereby possibly making switches superfluous. The values of the impedances of the hybrid, as well as the frequency values of the filters can be chosen voluntarily, with each choice having consequences known/clear to a person skilled in the art. Each transceiver can be divided into a separate transmitter and receiver, whereby in combination with the hybrid such a receiver possibly (and dependently upon the chosen values) either is located in parallel with the transmitter or with the detector (and then possibly combined with the detector). Further parts like further impedances can be added, for example, in connections 55, 57, thereby causing consequences known/clear to a person skilled in the art.

The invention claimed is:

1. A modem coupled to a network via a coupling, said modem comprising:
    a transceiver for transceiving signals via said coupling,
    a detector for detecting signals, wherein when said detector detects signals being transceived by another modem coupled to said coupling in parallel to said modem, said modem switches from an active state to a passive state until said detector no longer detects signals being transceived by said another modem.

2. The modem according to claim 1, wherein said detector comprises a distinguisher for distinguishing upstream signals to be tranceived from said other modem via said coupling to said network and downstream signals to be transceived from said network via said coupling to said other modem.

3. The modem according to claim 1, wherein said modem comprises a filter to be coupled to said coupling.

4. The modem according to claim 1, wherein said modem comprises a switch coupled to said detector and to said transceiver for, in response to said detecting, switching said modem between said active and said passive states.

5. The modem according to claim 4, wherein said switch is in a high impedance state when said modem is in said passive state and said switch is in a low impedance state when said modem is in an active state.

6. The modem according to claim 1, wherein said modem comprises:
    a hybrid comprising:
        a first serial circuit comprising a first impedance and a first switch with a first point of them to be coupled to a first wire of said coupling,
        a second serial circuit comprising a second impedance and a second switch with a first point of them to be coupled to a second wire of said coupling,
        a third serial circuit comprising third impedances located between said wires of said coupling and coupled to said first points of said first and second serial circuits, and a fourth serial circuit comprising fourth impedances coupled to second points of said first and second serial circuits.

7. A method for coupling a modem to a network via a coupling, said method comprises:
   detecting signals via said coupling being transceived by another modem coupled to said coupling in parallel to said modem, and
   switching said modem from an active state to a passive state until signals being transceived by said another modem are no longer detected.

8. The method according to claim 7, wherein said method further comprises distinguishing upstream signals to be tranceived from said other modem via said coupling to said network and downstream signals to be transceived from said network via said coupling to said other modem.

9. The method according to claim 7, wherein said method comprises filtering between said modem and said coupling.

10. The method according to claim 7, wherein an input/output port of said modem is in a high impedance state when said modem is in said passive state and said input/output port is in a low impedance state when said modem is in an active state.

11. A modem coupled to a network via a coupling, said modem comprising:
   a transceiver for transceiving signals via said coupling;
   a detector for detecting coupling signals, wherein said detector detects signals to be transceived by another modem coupled to said coupling in parallel to said modem; and
   a bridge comprising:
      a first serial circuit comprising a first impedance and a first switch, wherein said first serial circuit is coupled to a first port of said coupling;
      a second serial circuit comprising a second impedance and a second switch, wherein said second serial circuit is coupled to a second port of said coupling;
      a third serial circuit comprising third impedances coupled between said first and second ports of said coupling and coupled to said detector; and
      a fourth serial circuit comprising fourth impedances coupled to said first and second serial circuits and to said detector.

12. The modem according to claim 11, wherein, in response to detecting signals to be transceived by another modem, said first and second switches are switched between active and passive states.

13. The modem according to claim 12, wherein said first and second switches in said active state corresponds to a low impedance and said passive state corresponds to a higher impedance.

14. The modem according to claim 11, wherein, in response to detecting signals to be transceived by another modem, said modem is switched into an active state or a passive state.

15. The modem according to claim 14, wherein said modem in said active state corresponds to a low impedance and said passive state corresponds to a higher impedance.

* * * * *